April 8, 1969 — L. K. DAVIS — 3,438,058
BOX PEN INKING SYSTEM

Filed Aug. 18, 1967 — Sheet 1 of 3

*INVENTOR.*
LINCOLN K. DAVIS

BY *Lawrence H. Poeton*

AGENT

INVENTOR.
LINCOLN K. DAVIS

AGENT

United States Patent Office 3,438,058
Patented Apr. 8, 1969

3,438,058
BOX PEN INKING SYSTEM
Lincoln K. Davis, South Easton, Mass., assignor to The Foxboro Company, Foxboro, Mass., a corporation of Massachusetts
Filed Aug. 18, 1967, Ser. No. 661,604
Int. Cl. G01d 15/16
U.S. Cl 346—140                      1 Claim

ABSTRACT OF THE DISCLOSURE

An inking system for a recording device wherein a box pen is provided with capillary partition means to reduce the fluid head pressure of the ink.

---

Figure 1:
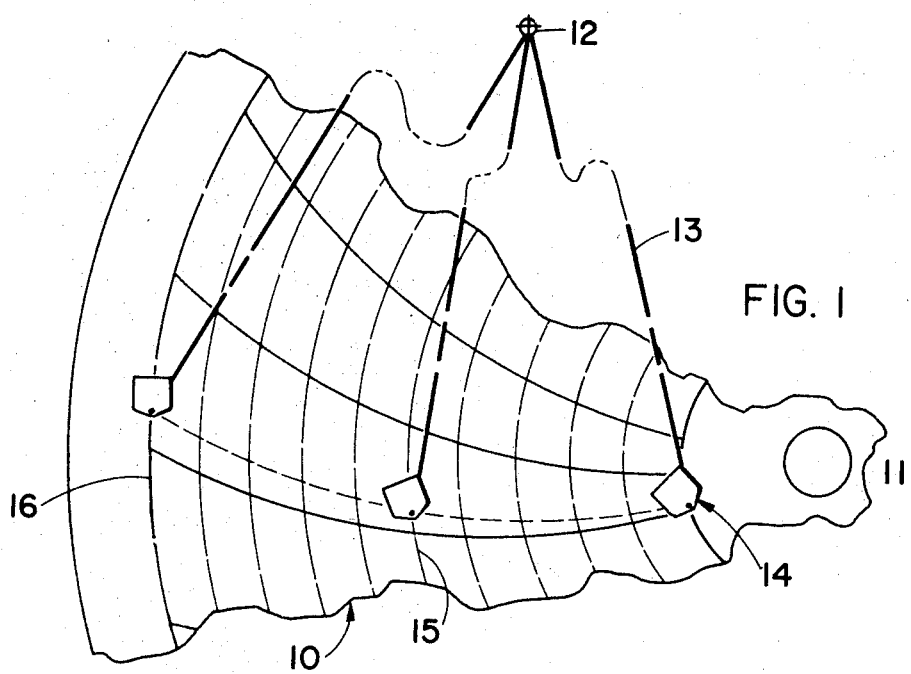
Figure 2:
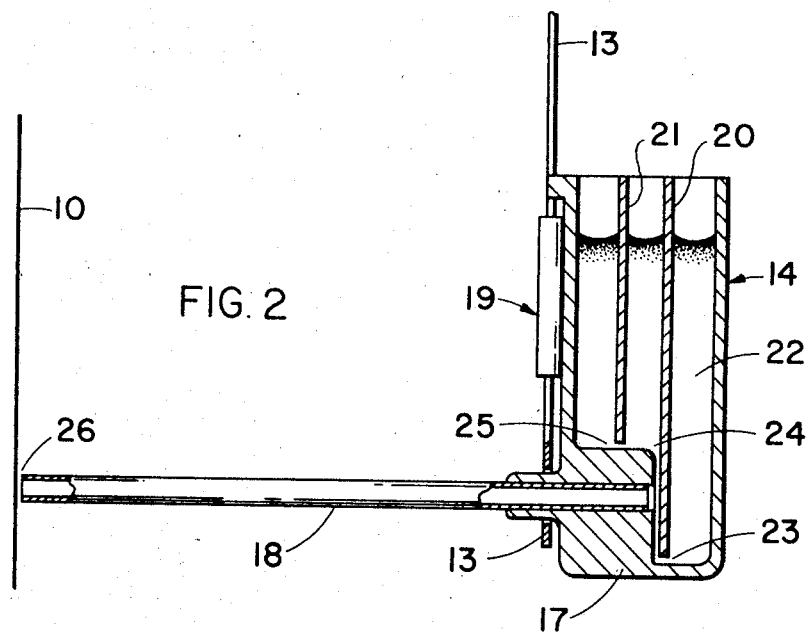
Figure 3:
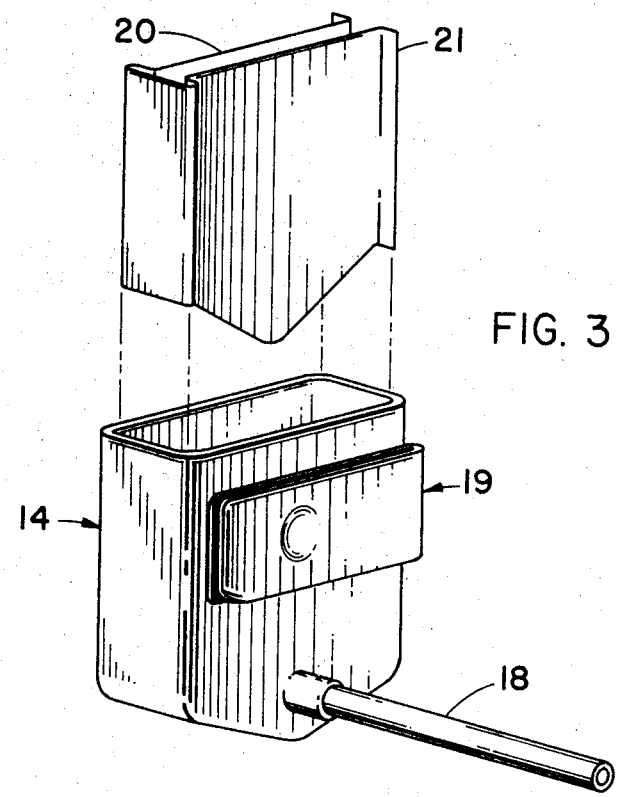
Figure 4:
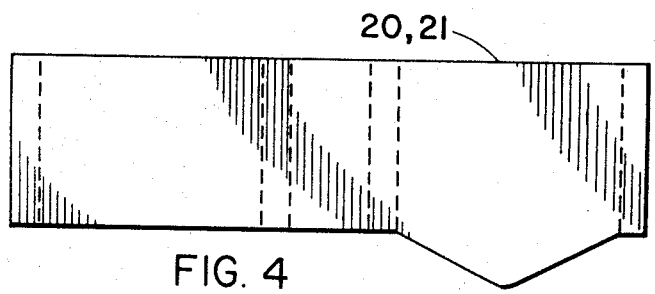
Figure 5:
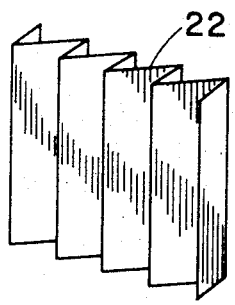
Figure 6:
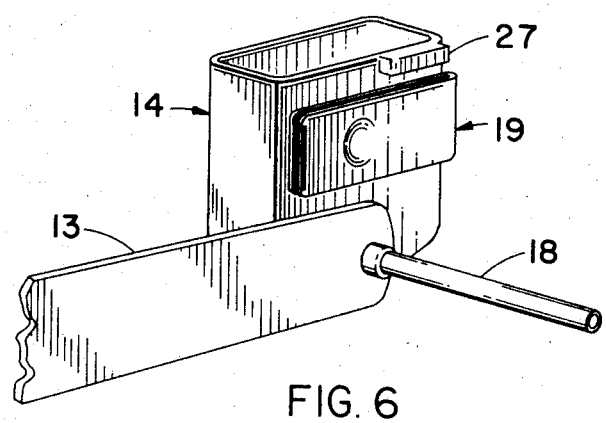
Figure 7:
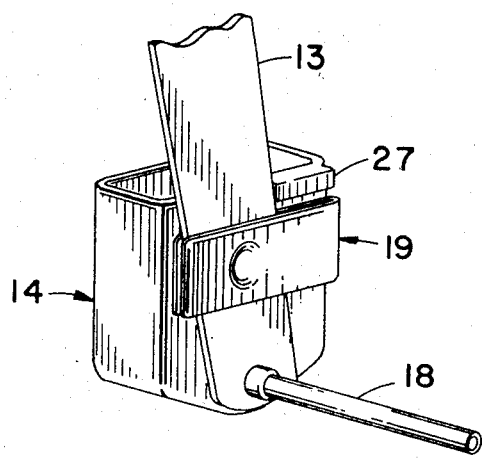
Figure 8:
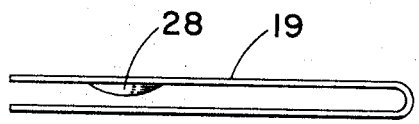

This invention relates to industrial instrument recording devices wherein ink records of variable condition values are made on a moving chart by a recording arm system leading to a pen which moves across the moving chart according to the variation of the measured condition values.

Various methods of delivering ink to the pen have been used. One of these is the use of a box pen mounted on the outer end of a pen arm. Thus, an ink supply is provided close to the pen so that the difficulties of transporting ink along the pen arm or otherwise from an ink supply remote from the pen, are avoided. Further, the location of the box pen makes for simple, quick and easy refill or replacement of the ink supply.

A difficulty in the use of a box pen has been in the liquid head pressure of a body of ink in the box pen. By necessity, a good supply of ink results in significant head pressure which is liable to cause ink flooding on the chart.

The box pen of this invention provides special capillary restriction means to control the liquid head pressure effect.

In this invention, the ink receptacle may be made of wettable transparent plastic so the filled level may be seen. At any point below the top of the container there is provided enhanced concave meniscus tension, which opposes the head pressure. Further the ink receptacle may be mounted on the pen arm at an angle to minimize liquid head pressure changes as the pen arm is moved up and down in a vertical plane as it swings across a rotating, vertically disposed chart. Thus, a lesser head pressure effect is provided at the low point, where near the chart center the chart travel is slowest, and a greater head pressure effect is provided at the high point, where, near the chart periphery, the chart surface travel is fastest.

In standard situations the box pen of this invention may be less deep so that danger of flooding is lessened, since the head of ink above the pen is less.

With the restraint provided by the new capillary effect, fast drying and greater mileage are results of the new inking efficiency.

The capillary controlled ink flow lessens mixing of colors in multiple-pen intruments.

The device of this invention is easily cleaned by simple removal of capillary partitions. The entire volume of this box pen is utilized as capillary cells.

Other objects and advantages of this invention will be in part apparent and in part pointed out hereinafter and in the accompanying drawings, wherein:

FIGURE I is a showing of box pen arrangement on a pen arm over a recorder chart, illustrating the movement of the pen arm and different positions of the box pen;

FIGURE II is a vertical transverse section of a box pen according to this invention;

FIGURE III is an exploded view of the box pen with respect to capillary partitioning means to be located in the pen;

FIGURE IV illustrates the simple sheet form of the partition means of FIGURE III, prior to bending to the shape shown in FIGURE III;

FIGURE V is an alternative form of partition means, in an accordion pleating;

FIGURES VI and VII illustrate the steps of mounting a box pen on a pen arm, in accordance with this invention, and FIGURE VIII is a further illustration of the pen arm guide and clip shown in FIGURES VI and VII.

In FIGURE I, a fragment of a recording chart 10 is shown. This is rotatable in a vertical plane about horizontal axis chart hub 11, in an ink recording arrangement in common usage in industrial instrumentation. The chart 10 is provided with concentric ring lines and radially curved cross lines, and an inking system is arranged for movement across the chart in a radial arc. The inking system is a pen arm 13 on a pivot 12, with a box pen 14 mounted at the lower end of the pen arm.

In this illustration, the pen arm is shown in two other locations, at essentially mid-point at 15, and in a chart peripheral point at 16. Since the box pen is fixed to the pen arm, the relation of the box pen to a level position changes as the pen arm moves from a low point in its arc to a high point. These box pen level changes are apparent in FIGURE I. As will be seen hereinafter, the box pen may be adjusted to achieve a best level arrangement for a particular application.

In the FIGURE I system, the pen arm pivot 12 is offset laterally with respect to a vertical line through the chart hub. Other arrangements place the pen arm pivot in different locations, and the box pen may be mounted on the pen arm for each situation in whichever angled relation therewith will provide the longest and most favorable level situation of the box pen along its arc of movement. In some situations the fluid pressure head of ink in the box pen may be favorably treated in this fashion by so tipping the box pen at the slow moving chart center area as to produce a lesser head and at the fast moving chart periphery as to produce a greater head, thus tending to supply ink according to the demands occasioned by the differing travel speeds of different parts of the chart.

In the box pen showing of FIGURE II, the chart 10 is shown at the left, in an edge view, with the box pen 14 having a base portion 17 into which a pen tube 18 is extended and secured. A clip 19 is secured to the box pen 14, and the pen arm 13 is mounted over the pen tube 18 and into the clip 19.

Within the pen 14 a pair of vertically disposed partitions 20 and 21 are provided to establish three side-by-side capillary cells for the ink body 22. These capillary partitions are made of thin, wettable material such as a suitable oxidized metal, or a wettable polyester. The capillary cells each may be of the order of one thirty-second of an inch wide.

The box pen 14 may be of transparent plastic to allow visual check of the amount of ink and to aid in filling so that the ink will be below the top, with capillary force upwards, in opposition to and in restraint of the fluid head pressure of ink in the pen.

The partitions 20 and 21 extend down into the box pen but short of the bottom thereof and in the case of partition 20, close to the inner end of the pen tube 18. Thus, narrow passages 23, 24, and 25 are provided to aid in ink flow from all parts of the pen to the ink tube 18, to avoid bubbles in the tube 18. When ink is low, these passages have capillary action in aid of the main ink flow capillary pull at 26 at the chart end of the pen tube 18.

The capillary rise of the ink in the cells effectively reduces the head of ink above the pen tip at 26. The result is restraint of the ink flow. In this structure, the top of the capillary cells is exposed to atmosphere.

More than two partitions may be used, as desired. The spring mounting form of the FIGURE II partitions is shown in the exploded view, FIGURE II, as formed from the flat strip of FIGURE IV.

Another partition form is shown in FIGURE V, in accordion shape. In any case, the simple mode of mounting such partitions is by lateral spring pressure of the partitions themselves against the inner walls of the box pen 14.

FIGURES VI through VIII illustrate the steps of mounting the box pen 14 on the pen arm 13, first in FIGURE VI by extending the pen tube 18 through an opening in the lower end of the pen arm. Then, as in FIGURE VII, by relative pivoting movement, the pen arm 13 is moved into and held in the clip 19 by a dap 28, and against a stop 27, to establish the desired relative angle between the box pen and the pen arm.

In the adjustment of the box pen, it may be held by the clip 19 without being butted against the stop 27 for a special angle, or as in FIGURE III, the stop may be the inner end of the clip 19.

This invention therefore provides a new and useful box pen system, wherein capillary action is used to prevent flooding by opposing ink head pressure. This is accomplished by forming special capillary partition cells in the box pen.

As many embodiments may be made of the above invention, and as changes may be made in the embodiment set forth above without departing from the scope of the invention, it is to be understood that all matter hereinbefore set forth and in the accompanying drawings is to be interpreted as illustrative only and not in a limiting sense.

I claim:

1. In an industrial recording instrument system wherein ink records of variable condition values are made on a moving chart by a recording arm system which moves across said moving chart according to the variation of said condition values, a box pen system as a part of said recording arm system, said box pen comprising an ink receptacle mounted on a pen arm, a pen tube extending into said receptacle to receive ink therefrom, and partition means, mounted within said ink receptacle to provide capillary cells in said receptacle to reduce the liquid head effective pressure of ink in said receptacle with respect to ink applied to said chart through said pen, wherein said pen arm is mounted for pivotal movement in a vertical plane, said box pen being mounted on said arm at an angle with respect thereto such that at a low point in said vertical movement the box pen is tipped to establish ink therein in a lesser depth, lesser head pressure situation, and at a high point in said vertical movement in a greater depth, greater head pressure situation.

References Cited

UNITED STATES PATENTS

| | | | |
|---|---|---|---|
| 841,222 | 1/1907 | Bowman | 346—140 |
| 1,573,339 | 2/1926 | Watts | 346—140 |
| 1,870,266 | 8/1932 | Spitzglass | 346—140 |
| 1,917,572 | 7/1933 | Binckley | 346—140 |

OTHER REFERENCES

German printed application No. 1,164,110, Feb. 27, 1964.

RICHARDSON B. WILKINSON, *Primary Examiner.*

J. W. HARTARY, *Assistant Examiner.*